Aug. 3, 1943.　　　　H. L. PORCH　　　　2,325,919
APPARATUS FOR HANDLING FRUIT
Filed May 20, 1941　　　　2 Sheets-Sheet 1
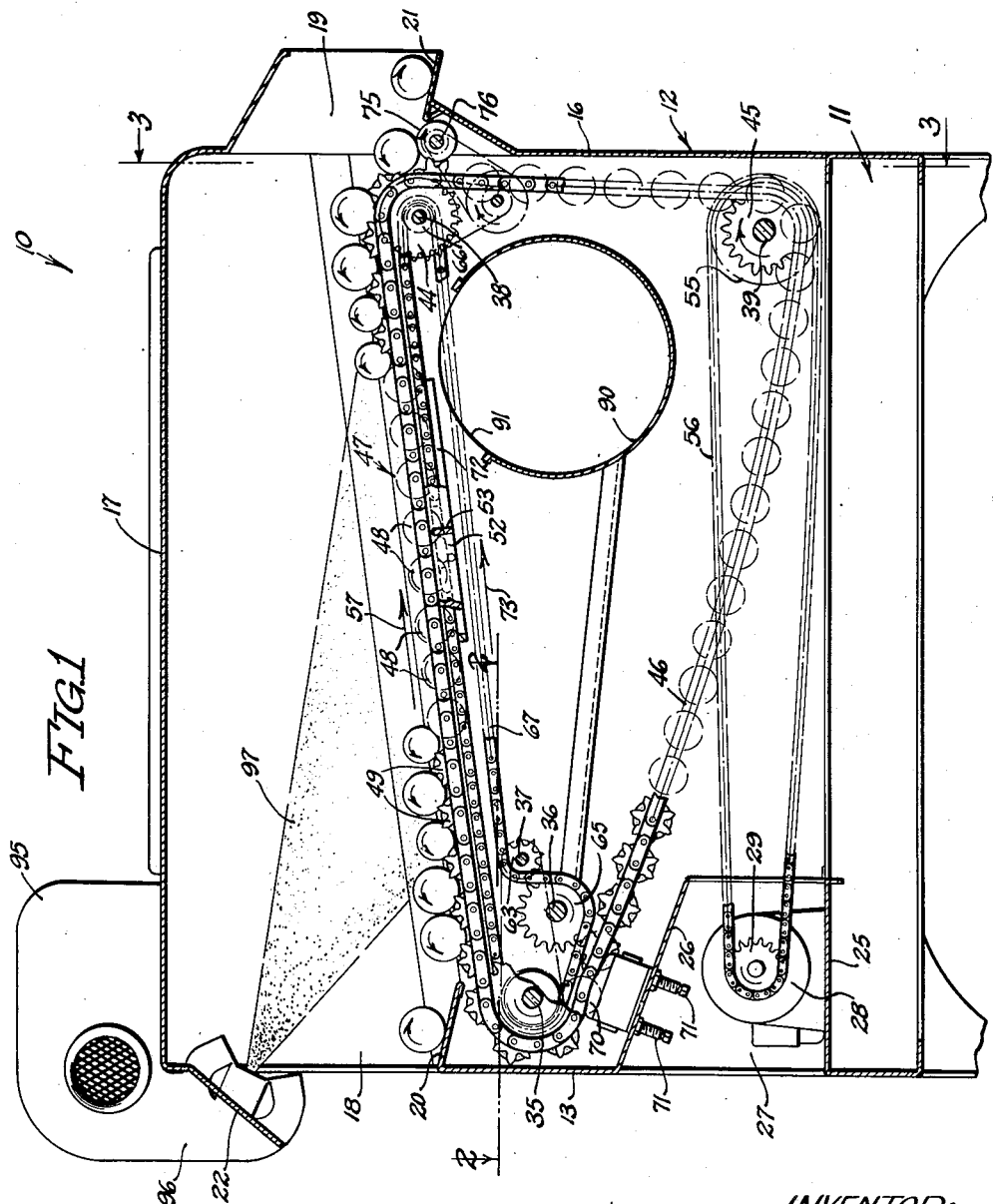
INVENTOR:
HOWARD L. PORCH
BY
ATTORNEY Aug. 3, 1943.   H. L. PORCH   2,325,919
APPARATUS FOR HANDLING FRUIT
Filed May 20, 1941   2 Sheets-Sheet 2
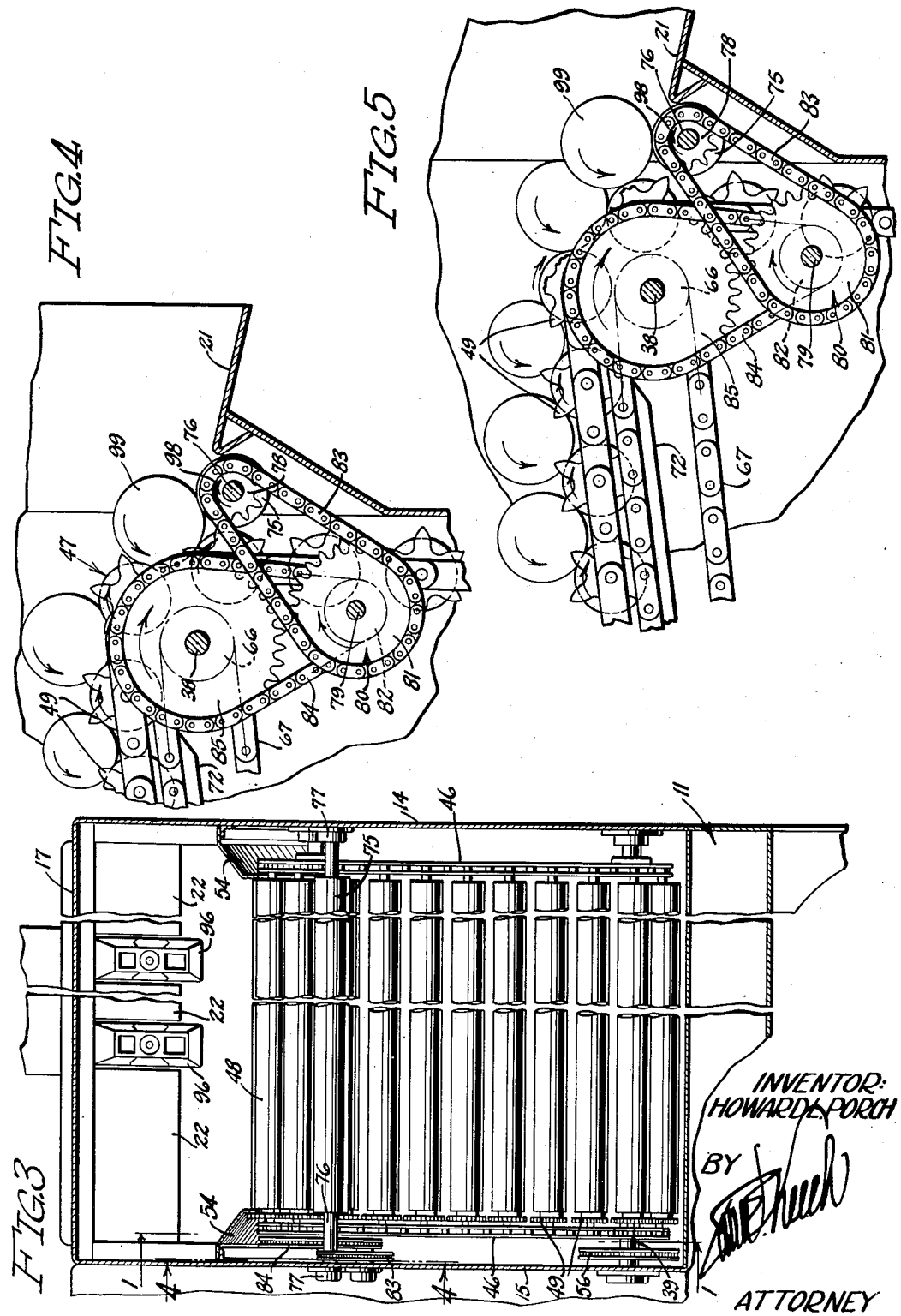
INVENTOR:
HOWARD L PORCH
BY
ATTORNEY Patented Aug. 3, 1943

2,325,919

UNITED STATES PATENT OFFICE 2,325,919

APPARATUS FOR HANDLING FRUIT

Howard L. Porch, Riverside, Calif., assignor to Food Machinery Corporation, San Jose, Calif., a corporation of Delaware Application May 20, 1941, Serial No. 394,317

3 Claims. (Cl. 198—65)

This invention relates to the art of processing fruit and the like, and particularly to the art of treating fruit with a coating material.

It has for long been common practice to treat certain fruits and certain vegetables with coating material as a part of the process of preparing these commodities commercially for shipment to market. The purpose of this treatment is to inhibit the shrinkage of the commodity treated and thus cause the latter to reach the ultimate consumer in fresh condition. The most common coating material used in this treatment in the past has been paraffin. Other coating materials having advantages over paraffin for use in this treatment of fruit have not gone into use because of the inadequacy of the equipment available for their application to the fruit. For instance, certain resins are very desirable for use as coating material on fruit by virtue of their clear transparent character causing them to thus preserve the natural beauty of the fruit and present this unimpaired to the view of the prospective purchaser, but the use of these resins as coating materials has not been practical owing to the fact that these resins accumulate on the equipment used for conveying the fruit so as to render the surfaces of this equipment tacky and thus interfere with the proper handling of the fruit, in some instances causing the fruit to be pinched and crushed by the equipment.

It is an object of my invention to provide an apparatus for handling fruit to facilitate the treatment of the latter with a coating material which will permit the use of a coating material, accumulations of which become tacky, but which apparatus will handle the fruit without damage thereto.

It is a further object of the invention to provide an apparatus for handling fruit while the latter is subjected to a treating process, such as the application of a coating material thereto, which apparatus has a high degree of flexibility as to the volume of the stream of fruit it is adapted to handle.

The manner of accomplishing the foregoing objects as well as further objects and advantages, will be made manifest in the following description taken in connection with the accompanying drawings, in which:

Fig. 1 is a transverse sectional view of a preferred embodiment of the apparatus taken on the line 1—1 of Fig. 3.

Fig. 2 is a diagrammatic fragmentary plan view taken on the line 2—2 of Fig. 1.

Fig. 3 is a vertical transverse sectional view taken on the line 3—3 of Fig. 1.

Fig. 4 is an enlarged detail sectional view taken on the line 4—4 of Fig. 3 and illustrating one phase in the operation of the invention and particularly the discharge of fruit from the conveyor thereof.

Fig. 5 is a view similar to Fig. 4 illustrating a phase of the operation immediately following that shown in Fig. 4.

Referring specifically to the drawings, the apparatus 10 of the invention includes a base frame 11 on which is supported a conveyor housing 12 having a front wall 13, side walls 14 and 15, a rear wall 16, and a top wall 17. The walls 13 and 16 have front intake and discharge openings 18 and 19 respectively, the wall 13 providing a receiving plate 20 at the bottom of the opening 18, while the wall 16 provides a discharge plate or drop board 21 at the bottom of the opening 19. Extending downwardly from the upper edge of the intake opening 18 is a series of baffle plates 22 arranged in spaced relation and lying in an outwardly inclined plane. The housing 12 is also provided with a floor 25, which floor unites with a plate 26 to form a motor room 27. Mounted in the motor room 26 on the floor 25 is an electric motor 28 having a sprocket pinion 29.

Journalled at their opposite ends in suitable bearings provided on side walls 14 and 15 are shafts 35, 36, 37, 38, and 39. The shaft 35 has conveyor chain sprockets 42, while the shafts 38 and 39 have conveyor chain sprockets 44 and 45, these sprockets having conveyor chains 46 trained thereabout, these chains being part of a fruit carrying conveyor 47.

This conveyor also includes an endless series of conveyor rollers 48 which are pivotally mounted between the chains 46, each of these rollers having a spinner sprocket 49 provided adjacent one of its ends, all these spinner sprockets being disposed along one side of the machine.

That portion of the conveyor 47 which lies between the sprockets 42 and 44 may be considered the upper run of the conveyor, and this portion of the conveyor is supported through the chains 46 by rails 52 on which said chains travel, said rails being supported by spacers 53 secured upon the side walls 14 and 15 of the housing.

Extending obliquely downward from these side walls are fruit guards 54, the lower edges of these guards being bent downwardly just opposite the ends of the rollers 48 as clearly shown in Figs. 1 and 3.

Fixed on the shaft 39 is a sprocket 55 which is connected by a chain 56 to the pinion 29 so that the conveyor 47 is driven when the motor 28 is energized, the upper run of this conveyor then traveling in the direction indicated by the arrow 57. (See Fig. 1.)

Fixed on the shafts 35 and 37 are sprockets 60 and 61 which are connected by a chain 62 so that the shaft 37 is driven by the shaft 35 (see Fig. 2). Also fixed on the shaft 37 is a spinner drive sprocket 63, while a roller 64, a sprocket 65, and a roller 66 are freely rotatable respectively on shafts 35, 36, and 38.

Encircling the sprockets 63 and 65, and the rollers 64 and 66 (see Fig. 1) is a spinner chain 67.

Provided on the plate 26 is an adjustable cam 70 which is adapted to be adjusted upwardly and downwardly by means of screws 71. This cam lies in the plane of the chain 46 and shifts this chain upwardly as it approaches the adjacent sprocket 42, thereby bringing the spinner sprockets 49 of the rollers 48 supported by this portion of the chains 46 into meshing relation with the chain 67 where the latter extends between the sprocket 65 and the roller 64.

Supporting the chain 67, where this travels between the rollers 64 and 66, so as to maintain this chain in mesh with the spinner sprockets 49 in the upper flight of the conveyor 47, is a guide track 72 which is also supported on the side wall 15. The drive hereinabove described for the spinner chain 67 operates so that when the upper run of the conveyor 47 travels in the direction of the arrow 57 the spinner chain is caused to travel in the direction of the arrow 73. (See Fig. 1.)

Pivotally mounted just between the discharge end of the conveyor 47 and the drop board 21 is a roller 75 having trunnions 76 which journal in bearings 77 mounted on the walls 14 and 15. One of the trunnions 76 (as shown in Fig. 3) has a sprocket 78. Also mounted on the side wall 15 is a stud shaft 79 carrying a double sprocket 80 which includes a large diameter sprocket 81 and a small diameter sprocket 82. The sprocket 78 and large diameter sprocket 81 are connected by a chain 83. The small diameter sprocket 82 is connected by a chain 84 to a large diameter sprocket 85 which is fixed on the adjacent end of shaft 38.

Extending through the housing 12 is a large diameter suction tube 90 having an opening 91 disposed just beneath the upper run of the conveyor 47, this tube connecting with a suction blower unit (not shown) which exhausts air from the tube 90 so as to suck air downwardly through the spaces between adjacent rollers 48 of conveyor 47 as these rollers travel in the upper run of the conveyor.

Mounted on the top 17 of the housing 12 is a coating material atomizing unit 95, this unit having two nozzles 96 which extend inwardly through the openings between baffle plates 22. When the apparatus 10 is operated, these nozzles direct streams 97 of atomized particles of coating material downwardly and forwardly into the treating chamber formed by the housing 12 so that said particles are sucked downwardly by the suction through the conveyor 47 and applied to the outer surfaces of the fruit traveling in the upper run of the conveyor.

*Operation*

The apparatus of my invention is particularly useful in the applying of coating materials to fresh fruit and the like where said coating materials tend to produce a tacky film on the rollers supporting the fruit. Hitherto, this tacky film has caused a pinching or crushing of the fruit, thus releasing the juice from the fruit onto the apparatus and completely nullifying the good effects which otherwise could be produced by the coating of the fruit. This is true not only as to the fruit which is pinched, but as to the other fruit which escapes being pinched, because the latter is wet by the juice released onto the apparatus by the damaged fruit.

For purposes of illustration, it may be assumed that the atomizing unit 95 is supplied with a solution of a resinous coating material and that the streams 97 comprise atomized particles of the solution. The fruit is delivered to the apparatus 10 over the fruit receiving plate 20 from which the fruit rolls onto rollers 48 which are traveling in the direction of the arrow 57. At the same time, these rollers are being spun by the spinner chain 67 so that their upper surfaces travel in the same direction as the arrow 57.

It is to be noted that the rotation of the rollers 48 by the spinner chain 67 is uniformly imparted to these rollers throughout the entire period that these rollers support fruit from the time it is received from the plate 20 until the time this fruit is discharged from the conveyor.

It is also to be noted that the chain drive mechanism for the roller 75 (shown in Figs. 1, 3, 4, and 5) rotates this roller in the direction of the arrow 98. A relatively high peripheral velocity is thus imparted to the roller 75. The peripheral velocity of the rollers 48 is much less than that of the roller 75, though in the same direction.

Fruit discharged from the conveyor 47 is deposited onto the roller 75 which, owing to its rotation at a high rate, delivers this fruit quickly onto the drop board 21.

Fig. 4 illustrates a piece of fruit 99 in a most unfavorable position at the discharge end of the conveyor 47, where this fruit is simultaneously in contact with two of the rollers 48 and with the roller 75. The speed with which the latter roller turns, however, is sufficient to remove the fruit 99 from the path of the roller 48 directly behind this piece of fruit, even though the direction of rotation of the latter roller is such as to tend to draw this piece of fruit inwardly between this roller and the roller 75. The differential in rates of rotation between the roller 75 and this roller 48, however, is such that as this roller 48 approaches the position in which it is shown in Fig. 5 the roller 75 ejects the piece of fruit 99 as shown in this view so that it is in no wise pinched or damaged between the roller 75 and the aforementioned roller 48.

After the machine has been operating in the treating of fruit as with a spray of resinous coating material for a few hours, the coating material contained in the atomized streams 97 becomes deposited on the surfaces of the rollers 48 and 75 so as to make these tacky. This causes these pieces of fruit to stick to the rollers 48 and tends to carry the pieces of fruit downwardly into the position in which a piece of fruit 99 is shown in Fig. 4. The tacky deposit on the roller 75, however, only makes this more effective, in this circumstance, to eject the fruit from directly in front of the downwardly swinging rollers 48 and deliver this fruit uninjured onto the dropboard 21.

Owing to the forward travel of the upper surfaces of the rollers 48 in conveying fruit through the apparatus 10, the delivery of an excess of fruit to the apparatus over and above the amount which will fill the valleys between adjacent rollers 48, produces an automatic progressing of the fruit forwardly from valley to valley so as to accommodate this excess of fruit. This gives the apparatus 10 a very flexible capacity as to the volume of fruit it can process and permits it to handle temporary overloads which are not uncommon in fruit packing houses.

What I claim is:

1. In an apparatus suitable for handling fresh fruit in the presence of tacky material, the combination of: a conveyor including an endless series of travelling rollers which support said fruit in the valleys between said rollers and convey the same along a given path toward the end of which said rollers move downwardly; rotary means disposed parallel with but outside the course travelled by said rollers and extending into the path of fruit carried in the valleys between adjacent rollers of said conveyor where these rollers are moving downwardly; means for rotating said rotary means at a sufficient rate of speed, and with the upper surface thereof moving in the same direction as said fruit is conveyed along said path, so that contact of said fruit with said rotary means results in said fruit being quickly expelled from the respective conveyor valleys in which it was travelling and in the propulsion of said fruit over said rotary means away from said conveyor; and means positioned for receiving said fruit as it is thus delivered over said rotary means.

2. In an apparatus suitable for handling fresh fruit in the presence of tacky material, the combination of: a conveyor including an endless series of travelling rollers which support said fruit in the valleys between said rollers and convey the same along a given path toward the end of which said rollers move downwardly; means for uniformly rotating said conveyor rollers while said fruit is being carried on them to move their upwardly-disposed surfaces in the same direction that said fruit is being carried; rotary means disposed parallel with, but outside the course travelled by said rollers and extending into the path of fruit carried in the valleys between adjacent rollers of said conveyor where these rollers are moving downwardly; means for rotating said rotary means at a sufficient rate of speed, and with the upper surface thereof moving in the same direction as said fruit is conveyed along said path, so that contact of said fruit with said rotary means results in said fruit being quickly expelled from the respective conveyor valleys in which it was travelling and in the propulsion of said fruit over said rotary means away from said conveyor; and means positioned for receiving said fruit as it is thus delivered over said rotary means.

3. In an apparatus suitable for handling fresh fruit in the presence of tacky material, the combination of: a conveyor including an endless series of travelling rollers which support said fruit in the valleys between said rollers and convey the same along a given path toward the end of which said rollers move downwardly; an ejector roller disposed parallel with but outside the course travelled by said conveyor rollers, said ejector roller having a diameter not substantially larger than that of said conveyor rollers, said ejector roller extending into the path of fruit carried in the valleys between adjacent rollers of said conveyor where these rollers are moving downwardly; means for rotating said ejector roller at a higher peripheral speed than that of said conveyor rollers and in the same direction so that contact of said fruit with said ejector roller results in said fruit being quickly expelled from the respective conveyor valleys in which it was travelling and in the propulsion of said fruit over said ejector roller away from said conveyor; and a board positioned for receiving said fruit as it is thus delivered over said ejector roller.

HOWARD L. PORCH.